US011665513B2

(12) United States Patent
Agrawal et al.

(10) Patent No.: US 11,665,513 B2
(45) Date of Patent: May 30, 2023

(54) MULTI-DEVICE POWER MANAGEMENT

(71) Applicant: INTERNATIONAL BUSINESS MACHINES CORPORATION, Armonk, NY (US)

(72) Inventors: Tushar Agrawal, West Fargo, ND (US); Sarbajit K. Rakshit, Kolkata (IN); Thomas Jefferson Sandridge, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 17/305,691

(22) Filed: Jul. 13, 2021

(65) Prior Publication Data
US 2023/0018103 A1    Jan. 19, 2023

(51) Int. Cl.
H04W 4/30 (2018.01)
G06N 3/08 (2023.01)
H02J 50/40 (2016.01)
H04W 4/08 (2009.01)
H04W 4/029 (2018.01)

(52) U.S. Cl.
CPC ............... *H04W 4/30* (2018.02); *G06N 3/08* (2013.01); *H02J 50/40* (2016.02); *H04W 4/08* (2013.01); *H04W 4/029* (2018.02)

(58) Field of Classification Search
CPC ......... H04W 4/30; H04W 4/08; H04W 4/029; H02J 50/40; G06N 3/08
See application file for complete search history.

(56) References Cited

U.S. PATENT DOCUMENTS

| 8,054,192 | B2 | 11/2011 | Grigsby |
| 9,252,628 | B2 | 2/2016 | Leabman |
| 9,349,322 | B2 | 5/2016 | Kim |
| 10,455,078 | B1 | 10/2019 | Santhar |
| 10,761,813 | B1* | 9/2020 | Echeverria ............... G06N 5/04 |
| 10,936,585 | B1* | 3/2021 | Echeverria ............. G05B 13/00 |

(Continued)

FOREIGN PATENT DOCUMENTS

| CN | 106663969 B | 7/2019 |
| EP | 3026782 A1 | 6/2016 |

OTHER PUBLICATIONS

Ignatius, Joe Louis Paul & Sooraj, Sasirekha & D, D & Revanth, P. (2018). A Working Model for Mobile Charging using Wireless Power Transmission. International Journal of Engineering & Technology. 7. 584. 10.14419/ijet.v7i3.12.16434, https://www.researchgate.net/publication/326701549_A_Working_Model_for_Mobile_Charging_using_Wireless_Power_Transmission.

(Continued)

*Primary Examiner* — Ernest G Tacsik
(74) *Attorney, Agent, or Firm* — Grant Johnson

(57) ABSTRACT

A method of power control for mobile devices, comprising providing a power management application in a first mobile device of a plurality of mobile devices, and wirelessly sharing power among the plurality of mobile devices according to at least one of the user-selectable power sharing templates. The power management application may include a plurality of user-selectable power sharing templates that define how the plurality of mobile devices will share power between themselves. The power management application may recommend one of the plurality of power sharing templates for activities by a user of the first mobile device.

15 Claims, 8 Drawing Sheets

(56) References Cited

U.S. PATENT DOCUMENTS

| | | | |
|---|---|---|---|
| 11,030,574 B1* | 6/2021 | Grande | G06N 20/00 |
| 2004/0142733 A1* | 7/2004 | Parise | H02J 50/80 |
| | | | 455/572 |
| 2013/0005252 A1 | 1/2013 | Lee | |
| 2016/0126779 A1 | 5/2016 | Park | |
| 2018/0041622 A1 | 2/2018 | Park | |
| 2018/0241255 A1* | 8/2018 | Leabman | H04B 5/0037 |
| 2019/0268666 A1* | 8/2019 | Lee | H04N 21/4532 |
| 2020/0091779 A1* | 3/2020 | Lee | H04B 5/0087 |
| 2020/0161903 A1 | 5/2020 | Oster | |
| 2020/0328622 A1 | 10/2020 | Abu Qahouq | |
| 2021/0249912 A1* | 8/2021 | Glover | H02J 50/30 |
| 2022/0236860 A1* | 7/2022 | Lee | G06F 3/0486 |

OTHER PUBLICATIONS

Mobile device management (MDM) solutions, https://www.ibm.com/security/mobile/mobile-device-management.

Mell et al., "The NIST Definition of Cloud Computing," Recommendations of the National Institute of Standards and Technology, U.S. Department of Commerce, Special Publication 800-145, Sep. 2011, 7 pgs.

Mobile Device Management Market by Component (Solutions and Services), Deployment (Cloud and On-Premises), Organization Size (Large Enterprises and SMEs), Operating System, Vertical (BFSI, Telecom, Healthcare), and Region—Global Forecast to 2025, https://www.marketsandmarkets.com/Market-Reports/mobile-device-management-market-105562389.html.

\* cited by examiner

MULTI-DEVICE POWER MANAGEMENT

BACKGROUND

The present disclosure relates to power management, and more specifically, to power management between multiple devices.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of these capabilities has been the creation of mobile data processing devices, such as smart phones; watches, fitness trackers, and other wearable devices; wireless headsets and/or speakers; head-mounted optical displays; etc. Many of these mobile data processing devices include local power storage, in addition to combined computing and data communication. The increased functionality of these mobile devices, however, increases demands on the mobile devices' respective local power sources.

As a result, power management has become important feature for many users of mobile data processing devices.

SUMMARY

According to embodiments of the present disclosure, a method of power control for mobile devices, comprising providing a power management application in a first mobile device of a plurality of mobile devices, and wirelessly sharing power among the plurality of mobile devices according to at least one of the user-selectable power sharing templates. The power management application may include a plurality of user-selectable power sharing templates that define how the plurality of mobile devices will share power between themselves. The power management application may recommend one of the plurality of power sharing templates for activities by a user of the first mobile device.

According to embodiments of the present disclosure, a computer program product for a method of power control for mobile devices, comprising a computer readable storage medium having program instructions embodied therewith. The program instructions may be executable by a processor to cause the processor to provide a power management application in a first mobile device of a plurality of mobile devices, and wirelessly share power among the plurality of mobile devices according to at least one of the user-selectable power sharing templates. The power management application may include a plurality of user-selectable power sharing templates that define how the plurality of mobile devices will share power between themselves. The power management application may recommend one of the plurality of power sharing templates for activities by a user of the first mobile device.

According to embodiments of the present disclosure, a mobile data processing device comprising a processor and a wireless power transfer system. The processor may be to execute instructions that cause the mobile data processing device to provide a power management application in a first mobile device of a plurality of mobile devices, and wirelessly share power among the plurality of mobile devices using the wireless power transfer system according to at least one of the user-selectable power sharing templates. The power management application may include a plurality of user-selectable power sharing templates that define how the plurality of mobile devices will share power between themselves. The power management application may recommend one of the plurality of power sharing templates for activities by a user of the first mobile device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
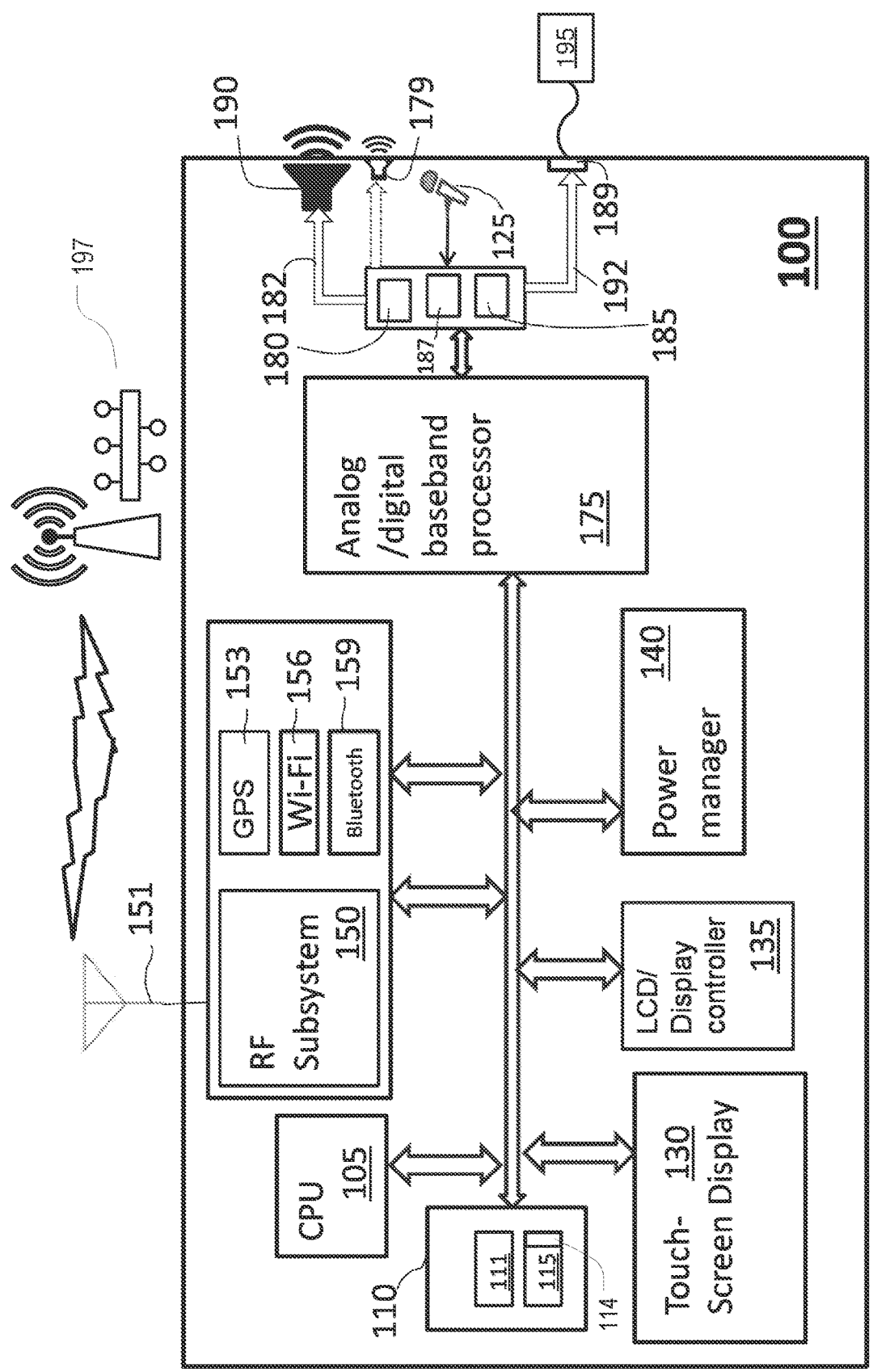
FIG. 1 schematically depicts a mobile phone device and a paired accessory device, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to power management; more particular aspects relate to power management between multiple devices. While the present disclosure is not necessarily limited to such applications, various aspects of the disclosure may be appreciated through a discussion of various examples using this context.

Today, many mobile data processing devices ("mobile devices") can be paired with other mobile devices such that they can selectively wirelessly communicate with each other. Some of these mobile devices can use this functionality to selectively communicate information about how much locally-stored power is remaining ("power status" or "power availability status"), and some of these mobile devices can display the reported power statuses of all of the paired devices to a user in a single console. For example, one mobile device (e.g., a smart phone) may show the remaining power of another paired wireless device (e.g., headphones). This functionality may help the user to monitor whether any of the paired devices need to be recharged. Additionally, some mobile devices can selectively wirelessly transfer power to another paired device when the two devices are in proximity to each other e.g., if a pair of devices are within a threshold power transfer distance, then those devices can initiate wireless power transfer from one mobile device to the other mobile device.

From a user perspective, however, different combinations of mobile devices and/or mobile device functionalities may be desired for certain activities. As a result, the power required by their respective mobile devices and/or amount of power consumption by different functionalities may depend on the specific activity the user is currently doing and/or anticipates doing in the future. Accordingly, one feature and advantage of some embodiments of this disclosure is a method and system by which a user can define and control the wireless power transfer templates and workflows between different groups of mobile devices based on these user priorities.

Another feature and advantage of some embodiments is a software application (app) having a graphical user interface (e.g., PowerUI, which is used as an example or a proxy throughout this disclosure, but is not intended to be limiting) through which the user can effectively manage the transfer of power between various mobile devices (e.g., devices to which the user has given permission, such as the user's own devices and/or friends' devices). This may include creating templates based on a type of activity and automatically switching between the templates based a detected current activity and/or predicted future activities. In some embodiments, this detection and/or prediction may utilize extrinsic and intrinsic data sources, such as: the user's calendar, the user's current location, the user's expected future location, identity of other people nearby, etc. In some embodiments, this may include identifying a workflow containing a plurality of templates and durations to use those templates using the PowerUI. For example, a workflow may indicate that the first priority is to ensure a minimum amount of power specified in a "meeting" template. The workflow may also indicate that a second priority is to transfer power pursuant to a "workout" template for 30 minutes and then switch to the "meeting" template.

Some embodiments may include a mobile app by which a user can create one or more templates/workflows of power distribution between a plurality of mobile devices according to personalized power transfer priorities, i.e., in addition to merely displaying the power statuses of the respective devices. The created templates/workflows may be shown in the PowerUI and, based on the user's selection of a template in the app, the mobile devices may dynamically and selectively begin sharing power among one or more particular pairs of mobile devices considering the current power statuses of the mobile devices and the user's indicated priorities, so that the user can perform their current activity and future activities in an effective manner.

In some embodiments, a user can create one or more templates/workflows for distribution of power in the PowerUI by first creating a custom name for the template(s). Next, the user can, with, e.g., a finger gesture in the PowerUI, define one or more power priorities. The user may also be able to chain templates into workflows, define one or more starting/triggering activities for each template in the workflow, define a duration or ending triggers for each template in the workflow, define one or more minimum power availability thresholds, etc. The templates' names may be shown on PowerUI, and accordingly based on selected template(s), the paired devices may calculate a power transfer direction and automatically initiate power transfer between themselves.

In some embodiments, the mobile application may be operably connected to an artificial intelligence (AI) system, which may create suggestions for activities and workflows for the PowerUI using previously detected activities and/or extrinsic and intrinsic data. These suggestions may be subsequently modified via manual configuration in some embodiments. Additionally or alternatively, these suggestions may be created with different levels, durations, directions, etc. of power distribution between the paired devices using actual/historical data about the power consumption of specific mobile devices by this specific user for a specific activity.

In some embodiments, the AI system may continuously adapt and improve the templates and/or workloads, both manually created and suggested, by collecting updated power use data and then using that data to update an underlying AI model. This updated power use data may be correlated by the user's detected activities and/or by the extrinsic and intrinsic data e.g., geolocation.

In operation, the user may select one or more of the templates from the PowerUI, as well as define how the selected template(s) will affect operation of the paired devices based on various predetermined conditions, time scales, and duration. Based on the selection of the one or more templates from the PowerUI and/or manual override by performing an appropriate command in the PowerUI, the mobile devices may responsively initiate wireless power transfer according to priorities in the selected template.

FIG. 1 schematically depicts a mobile phone device 100 and a paired accessory device, such as an external headset 195, consistent with some embodiments. The mobile phone device 100 may be a digital cellular communications device or other radio frequency communications terminal.

The mobile phone device 100 in FIG. 1 may include various hardware and software components, including but not limited to a control unit 105, such as a microprocessor (CPU) system, and a memory 110 having at least operating system software 111 and application software 115 for running mobile device operations. The application software may include a power management app 114. The control unit 105 may invoke/operate components, such as analog and/or digital baseband processing unit(s) 175 configured for receiving and processing data handling interface operations for a display interface such as touch-screen display interface 130 configured for both input and output operations, a keypad for a user to interface/enter user input signals, a microphone 125 as voice input mechanism, and a camera (not shown). The CPU and analog/digital baseband processing unit 175 may interface with a radio frequency (RF) transceiver subsystem 150 to provide analog cellular (baseband) call processing functionality, which may include an operatively connected antenna 151 for transmitting/receiving cellular phone signals for initiating and conducting mobile phone calls to other parties connected over a communications network. Further functional units provided in the mobile phone device 100 may include a global positioning system (GPS) receiver 153 for providing real-time location information. Further, in some embodiments, mobile phone device 100 may be equipped with wireless communications technologies and communication protocols such as Bluetooth® 159, WIFI (e.g., 802.11a/b/g/n) 156, cellular networks (e.g., CDMA, GSM, M2M, and 3G/4G/4G LTE/5G), near-field communications systems, satellite communications, via a local area network (LAN), via a wide area network (WAN), or any other form of communication that allows mobile phone device 100 to transmit information to or receive information, including power availability information.

Digital processing may further include components such as a screen display interface controller 135 to provide any operating liquid crystal display (LCD) and touch-screen display processing functionality, and a battery power/power management system 140. The CPU 105 of FIG. 1 may handle all internal processing, e.g., such as signal processing, data encoding and decoding operations, etc., or the various functions may be performed in whole or in part by specialized accelerators (not shown).

Although not shown, for processing input of audio signals received from a communications terminal, such as another land-line or mobile phone device 100 typically during speech communication with a remote party, the mobile phone device 100 may further include audio processing components, including any signal filters, gain amplifiers and/or audio speaker drivers, switch(es), any volume/mute control components, and audio coding/decoding operations (codec) performed by an audio codec unit (not shown). In one embodiment, an audio switch 187 provide functions for providing an output audio signal path 182 to a first (built-in terminal) audio speaker 190 via a speaker drive component 180, or alternatively, a second output audio signal path 192 to an external (wired) headset e.g., via a drive component 185 for driving an audio output or "auxiliary" audio port 189. In some embodiments, a further audio signal path (not shown) may enabled for providing an audio signal output to a hands-free blue-tooth (or like wireless connector) unit 159, e.g., providing a Bluetooth® interface, for wireless communication with the external wireless headset 195.

In embodiments, the mobile device 100 is configured in ordinary use for telephone communication purposes, where a user will speak into microphone 125 (or a microphone of the headset 195) for generating audio signals, which may be processed and encoded to a cellular radio signal by means of control device 105 in the device. The radio signal is subsequently transmitted to a receiving party device by means of a like RF transceiver subsystem 150 connected to an antenna 151.

In accordance with some embodiments, programmed instructions may be provided in a device firmware (not shown) and/or operating system software, e.g., provided in a memory 110. These program instructions configured to control operation for selectively enabling and disabling wireless power transfer via the battery power/power management system 140, wireless power transfer subsystem 179, and power management app 114 using e.g., medium and far-field radiative and non-radiative wireless power transfer techniques.

In an embodiment, the mobile phone device 100 is configured to operate in a switched cellular communications network, as typically known, by communicating with a cellular phone base station 197.

Figure 2:
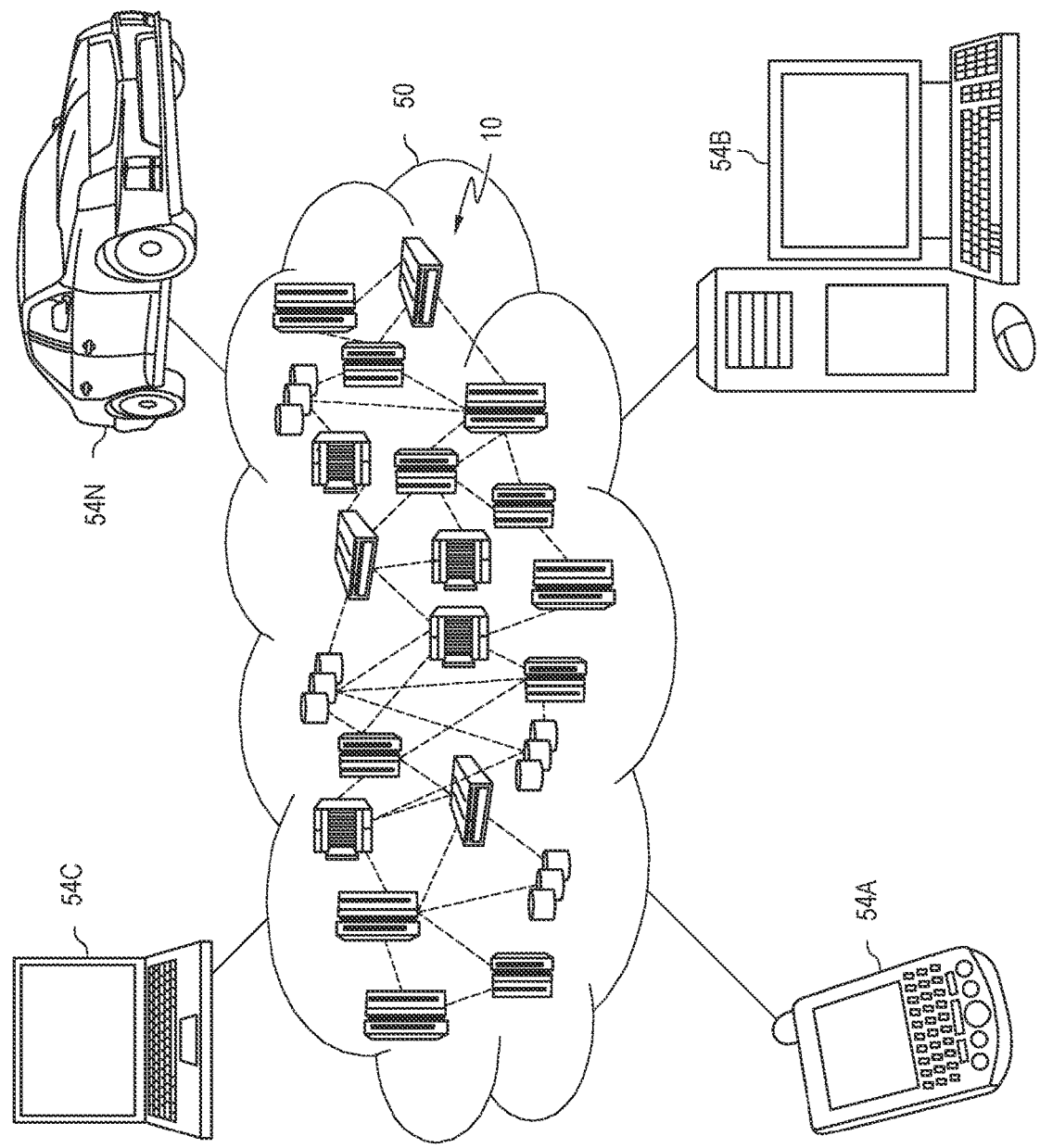
FIG. 2 illustrates one embodiment of a cloud environment consistent with some embodiments.

FIG. 2 illustrates one embodiment of a cloud environment consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
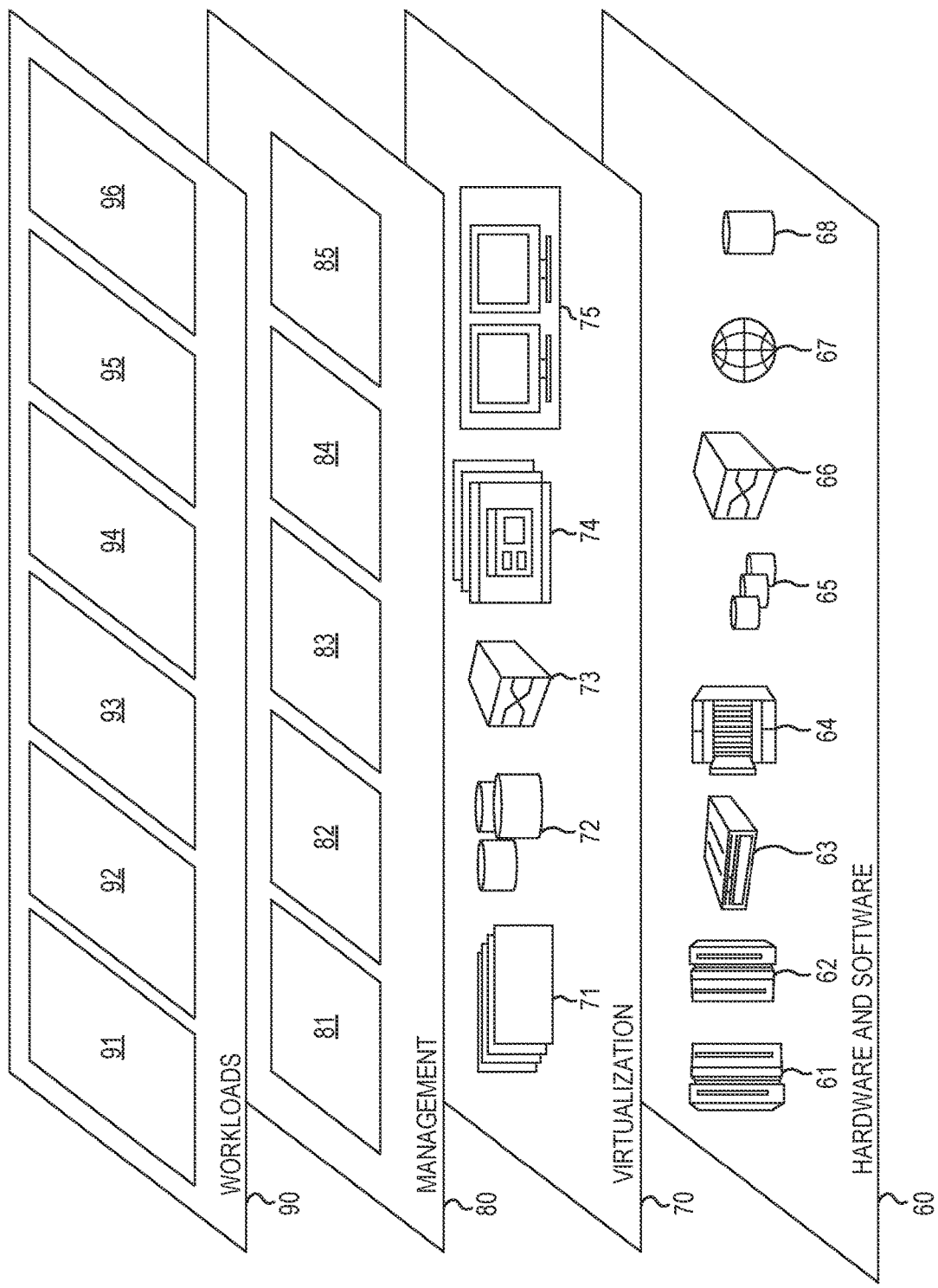
FIG. 3 shows a set of functional abstraction layers provided by a cloud computing environment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; application processor 96; and an artificial intelligence (AI) processing node 98.

Figure 4:
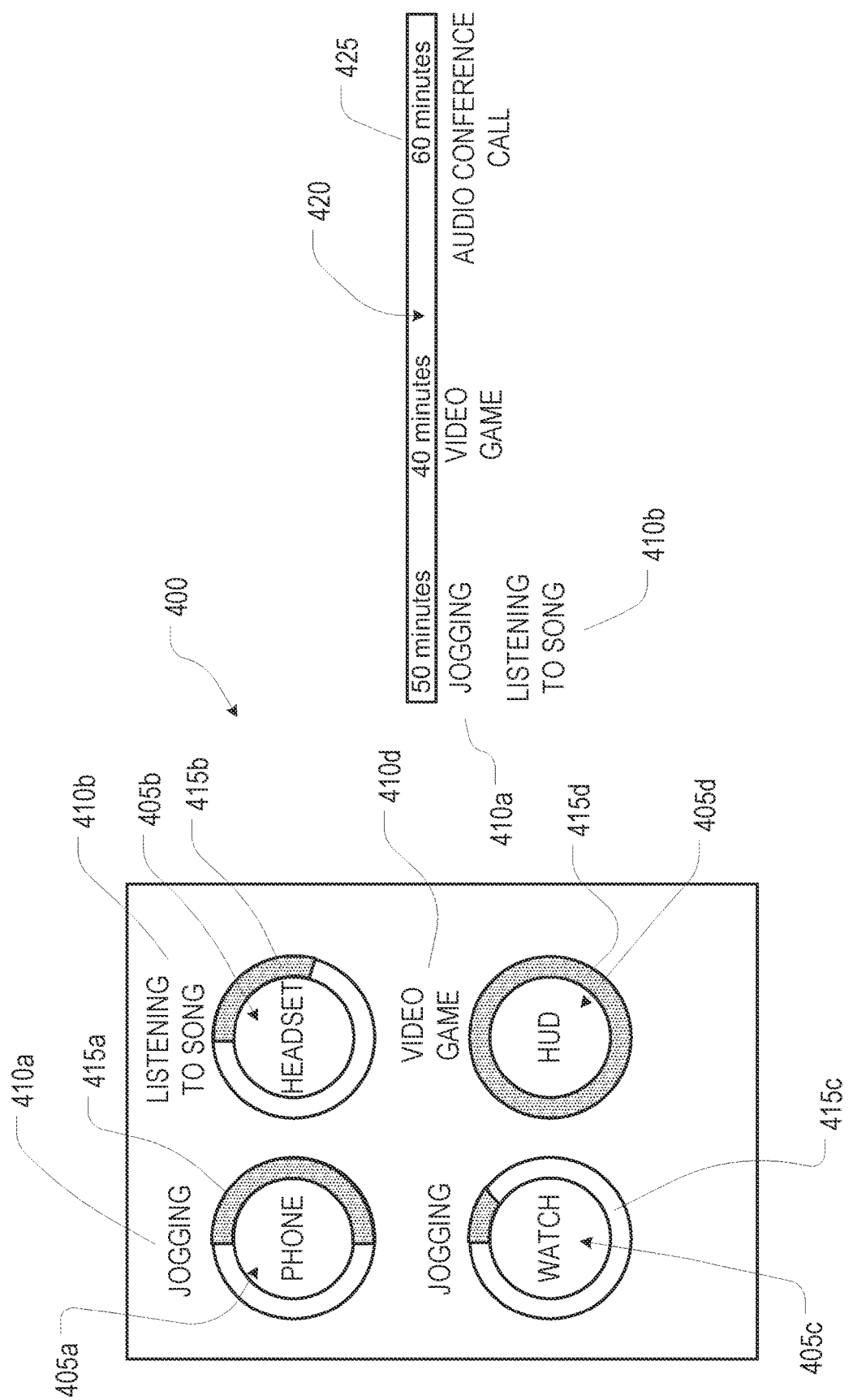
FIG. 4 is an example power management graphical user interface (PowerUI) of a power management application for a mobile phone device, consistent with some embodiments.

FIG. 4 is an example power management graphical user interface (PowerUI) 400 of a power management application 114 for a mobile phone device 100, consistent with some embodiments. The PowerUI embodiment 400 in FIG. 4 displays four paired devices 405a-405d (collectively "paired device 405"). Each paired device 405 may display its current power availability status using a power bar graphical element 415a-415d. Some of the paired devices 405 may also be associated with a current power transfer template 410a-410c, and some of the paired devices may also be associated with a future power transfer template 410d, such as via a workflow 420. These templates 410a-410c and 410d may be the same or may be different for each paired device 405.

In operation, a user may select two or more current 410a-410c and/or desired future 410d power transfer templates to create a power workflow 420 using e.g., a finger gesture on the touchscreen of the mobile phone device 100. The resulting workflow 420 may control which of the paired devices 100, 405 will share its available power with which other devices 100, 405, during which future time periods 425 based on predetermined thresholds and/or triggers.

Power Management Setup Method

Figure 5:
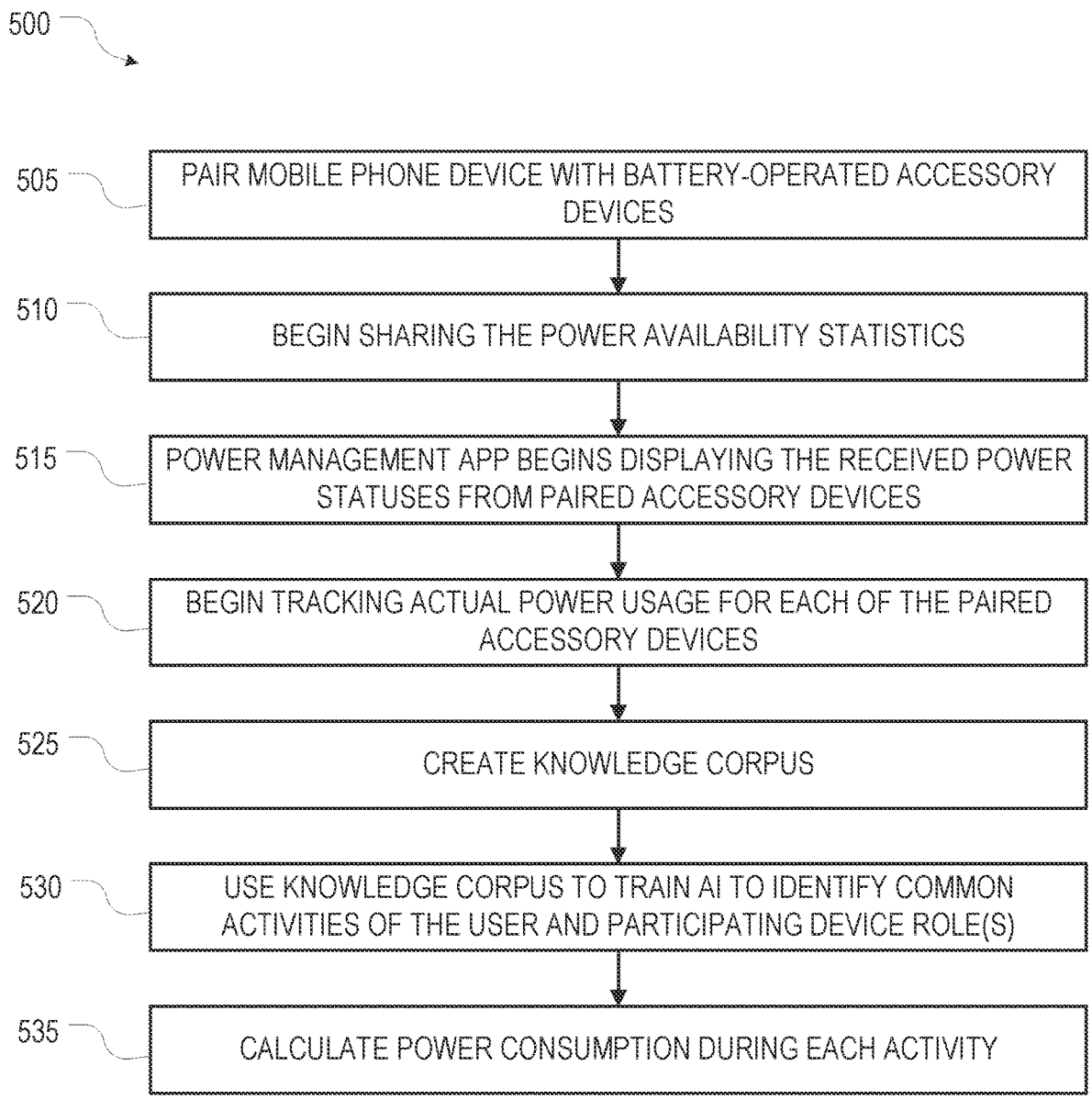
FIG. 5 is a flow chart showing one method of operating a power management application of a multi-device power management system, consistent with some embodiments.

FIG. 5 is a flow chart of a process 500 showing one method of operating a power management application 114 of a multi-device power management system, consistent with some embodiments. At operation 505, a mobile phone device 100 may be paired with one or more battery-operated accessory devices, such as the wireless headset 195, a fitness tracker, a heads up display unit, etc. Once the accessory devices are paired, then any accessory devices within range may begin sharing the power availability statistics to mobile phone device 100 at operation 510. This may include each of the paired accessory devices 195 transmitting its battery capability, its current available power, its current power discharge rate, and its current operational status (i.e., powered on, whether or not it is currently being actively used, etc.) to the mobile phone device 100. In some embodiments, this operation 510 may also include the paired accessory devices transmitting this information to each of the other accessory devices i.e., not only to the mobile phone device 100.

At operation 515, the power management app 114 on mobile phone device 100 may begin displaying the received power statuses from its various paired accessory devices on the PowerUI 400. In some embodiments, each paired accessory device may be identified uniquely, and when the paired accessory devices are within a predefined communication range, then their respective power statuses may show in the PowerUI 400.

At operation 520, the power management app 114 on the mobile phone device 100 may begin tracking the actual power usage for each of the paired accessory devices. This historical power usage may be indexed by the template currently in use (if any), as well as any intrinsic and extrinsic data sources available to the mobile phone device 100 and/or the cloud environment 50. Suitable intrinsic data sources include a current location of the mobile phone device 100, what application(s) are currently in use on the device 100, a recent acceleration profile of the device 100, etc. Suitable extrinsic data sources may include a current activity listed on the user's calendar, one or more future activities on the user's calendar, the network and/or Bluetooth IDs of any other devices 100 and/or accessory devices nearby the user, and the current settings of any paired accessory devices, etc.

Based on this historical use data, a knowledge corpus may be created (and, as will be discussed in more detail below, updated with real time data in some embodiments) at operation 525. At operation 530, the power management app 114 on mobile phone device 100 may use the knowledge corpus to train an AI system to identify common activities of the user, as well as the role(s) each participating device performs in that activity (e.g., a heavily used, not used, etc.). The mobile phone device 100 may also use this data to calculate how quickly each of the different paired devices consumed power during each identified activity at operation 535. This may include calculating an expected duration of use for each of the paired devices for each activity. In some embodiments, operations 530 and 535 may be performed in whole or in part by the artificial intelligence (AI) processing node 98 of the cloud environment 50.

Template Creation

Figure 6:
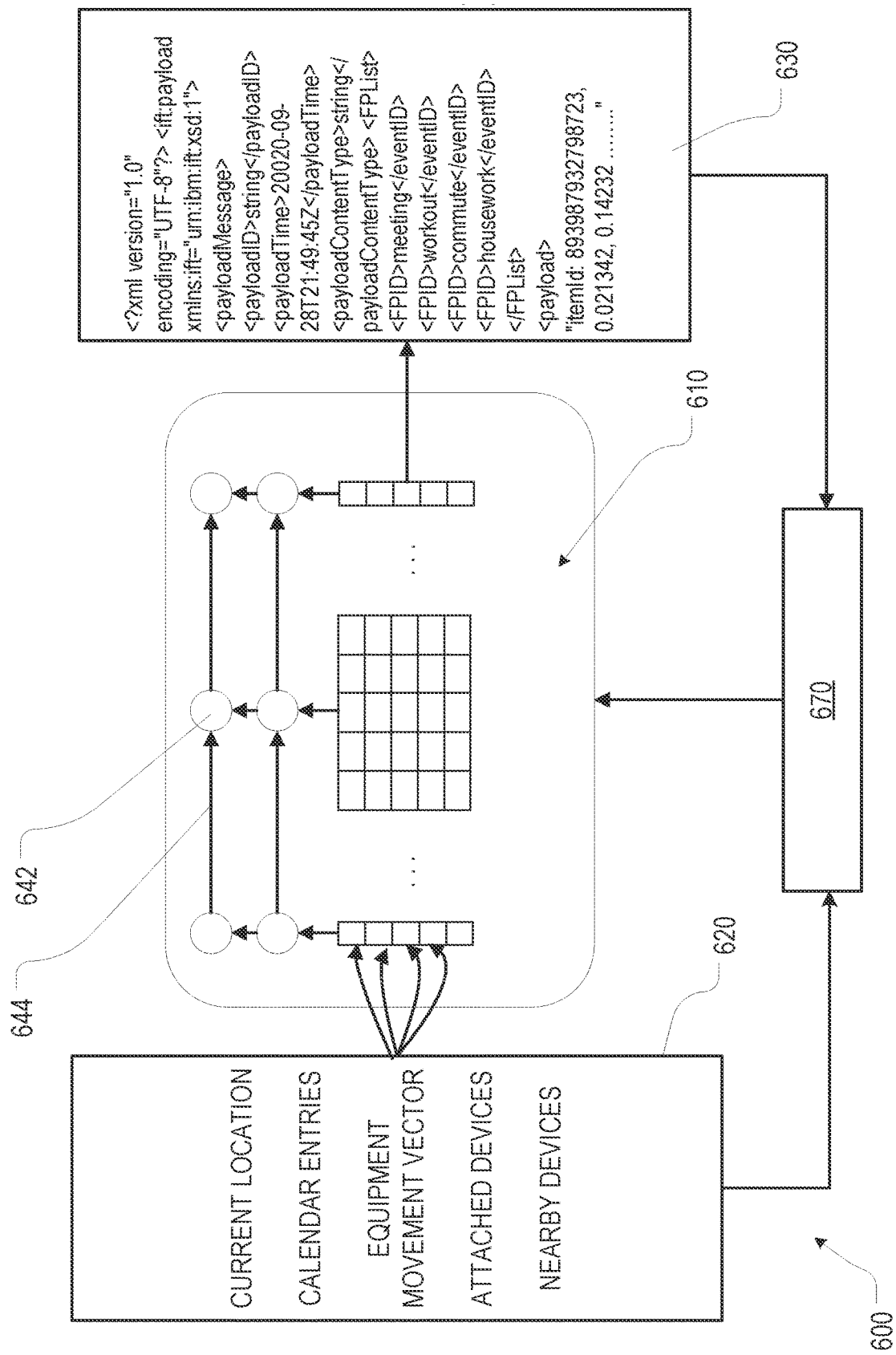
FIG. 6 is a system diagram for an artificial intelligence (AI) subsystem of the power management app, consistent with some embodiments.

FIG. 6 is a system diagram for an AI subsystem 600 of the power management application 114, consistent with some embodiments. In some embodiments, this AI subsystem 600 may be enabled in the mobile phone system 100. In other embodiments, it may be enabled in whole or in part by the artificial intelligence (AI) processing node 98 of the cloud environment 50.

The AI subsystem 600 in FIG. 6 may include a machine learning (ML) model 610 that may receive as input a plurality of feature vectors 620 containing time stamped events from a plurality of different extrinsic and intrinsic data sources (e.g., current location of the mobile phone device 100, output of sensors on the mobile phone device 100, entries on the user's calendar, nearby Wi-Fi sources, etc.), and may generate output 630 in the form of power usage profile ("PP") coefficients representing a plurality of activities and the predicted power usage for each of a plurality of paired and likely-paired accessory devices during that activity. For illustrative purposes, the AI subsystem 600 will be described with reference to a long short-term memory ("LSTM") class machine learning model. LSTM models may be desirable because they can remember values over arbitrary time intervals. This, in turn, may allow for classifying events in input time series data for particular entities, as there may be lags of unknown duration between important events in the time series. However, other types of ML models are consistent with the present disclosure, as are algorithmic models.

In some embodiments, the LSTM model may comprise a plurality of artificial cells 642 interconnected through connection points called gates 644. Each cell 642 in some embodiments may comprise an input gate, an output gate, and a forget gate. The cells 642 may be interconnected such that the output gate 644 of one cell 642 is the input gate of another cell 642.

The cells 642 in some embodiments may be the sub-entity that remembers the values over the arbitrary time intervals, and the gates 644 may be the sub-entity that regulates the flow of information into and out of the cell. Each gate 644 in the LSTM model may further encode a strength of a relationship in the connection between the output of one cell 642 and the input of another cell 642. The output of each cell 642, in turn, may be determined by the aggregate input(s) received from other cells 642 that are connected to it via gates 644, and thus by the outputs of these "upstream" connected cells 642 and the strength of the connections as determined by numeric weights on the gates 644.

LSTM models may be trained to solve a specific problem (e.g., identification of activities) by calculating a model error 670 and then using the model error to adjust the weights of the gates 644 such that a particular class of inputs produces the desired output. This weight adjustment procedure in these embodiments is known as "learning." Ideally, these adjustments lead to a pattern of weights that, during the learning process, converge toward an optimal solution for the given problem based on some cost function. In some embodiments, the cells 642 may be organized into layers. The layer that receives external input data in the form of the feature vectors 620 is the input layer. The layer that produces the ultimate result 630 is the output layer. Some embodiments include a large number of hidden layers between the input and output layers, commonly hundreds of such hidden layers.

During an initial configuration phase, the AI subsystem 600 in some embodiments may receive a training corpus. The training corpus may contain a set of training vectors from the data corpus collected at operation 620. Additionally or alternatively, the training corpus may include vectors collected from one or more similar users, such as other employees of an organization to whom mobile phone devices 100 have been issued. These training corpuses may further contain labels identifying which accessory devices were paired during an activity and the actual power usage by those devices during the activity.

During a subsequent operation phase, the AI subsystem 600 may receive as input an updated corpus for a particular user. The AI subsystem 600 may use this updated corpus to calculate as output 630 a set of coefficients that allow for identification of suggested activities for that particular user, as well as calculation of a predicted power usage profile for that particular user for each suggested activity. These activities may then be used to generate one or more suggested templates and/or workflows customized for that particular user.

In operation, the user may select a particular template and/or workflow for current use. This may be different than the suggested template and/or workflow. The mobile phone device 100 and one or more paired accessory may then begin to transfer power according to the selected template and/or workflow. Additionally, the mobile phone device 100 may collect updated power status of each device and/or accessory device under the selected template. The AI subsystem 600 may use this new data to update the ML model (i.e., adjust the calculated gate weights) in some embodiments. This data collection and model update cycle may be done each time the user uses the mobile device 100 in some embodiments. These embodiments may be desirable because the AI subsystem 600 may continuously adapt to the user's current usage patterns.

Figure 7:
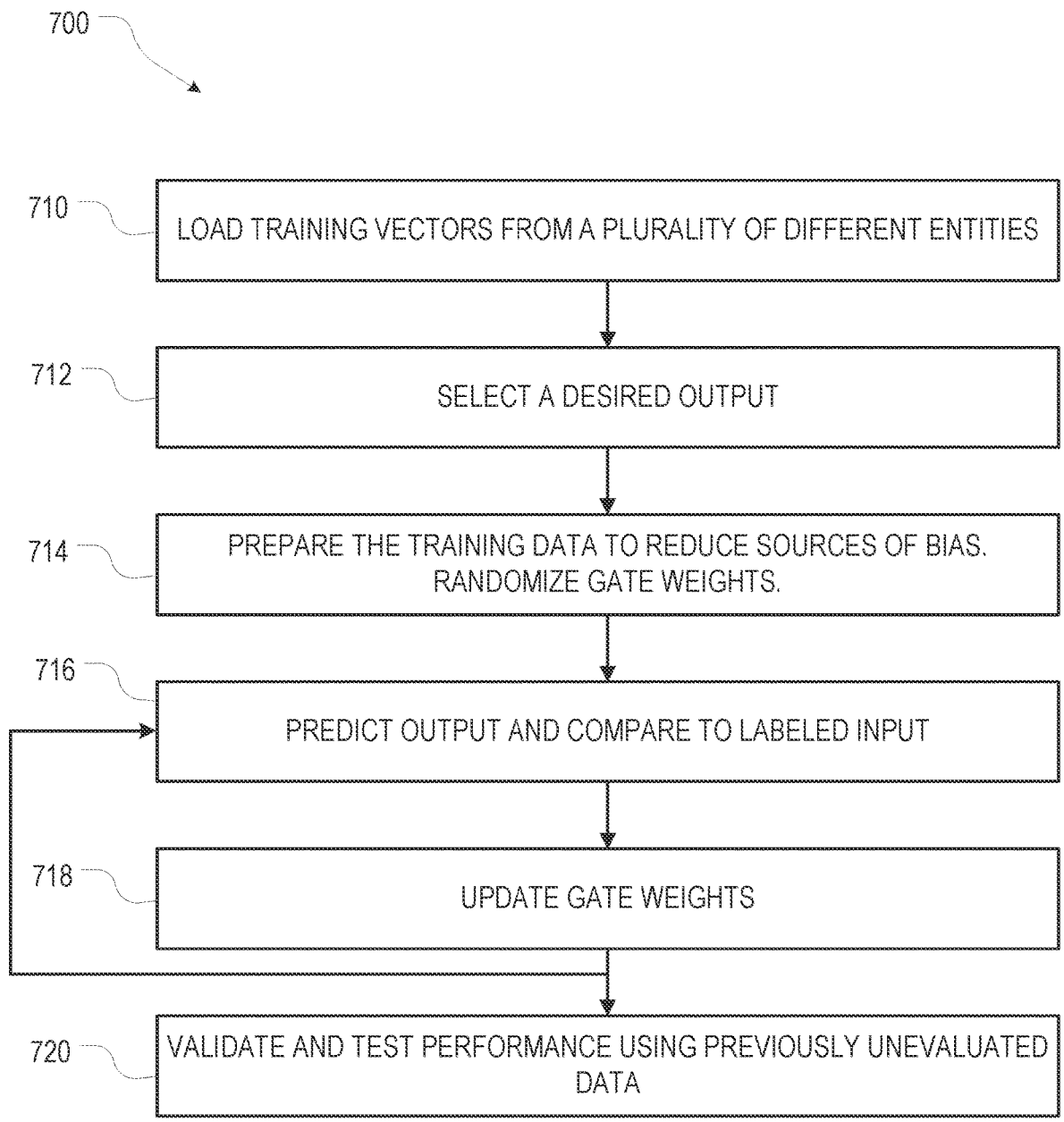
FIG. 7 is a flow chart illustrating one method of training the AI subsystem, consistent with some embodiments.

FIG. 7 is a flow chart illustrating one method of training 700 the AI subsystem 600, consistent with some embodiments. A user (or a system integrator) may begin by loading training vectors from the mobile phone device 100 at operation 710. Next, at operation 712, the user may select a desired output (e.g., a predicted activity). At operation 714, the training data may be prepared to reduce sources of bias, typically including de-duplication, normalization, and order randomization. The initial weights of the gates 544 for the ML model may also be randomized at operation 714

At operation 716, the ML model may be used to predict an output using set of input data vectors, and that prediction is compared to the labeled data. The error (e.g., the difference between the predicted value and the labeled data) is then used at operation 718 to update the gate weights. Operations 716-718 may be repeated, with each iteration updating the weights, until the training data is exhausted, or the ML model reaches an acceptable level of accuracy and/or precision. At operation 720, the resulting model may optionally be compared to previously unevaluated data to validate and test its performance.

Power Management Operation Phase

Figure 8:
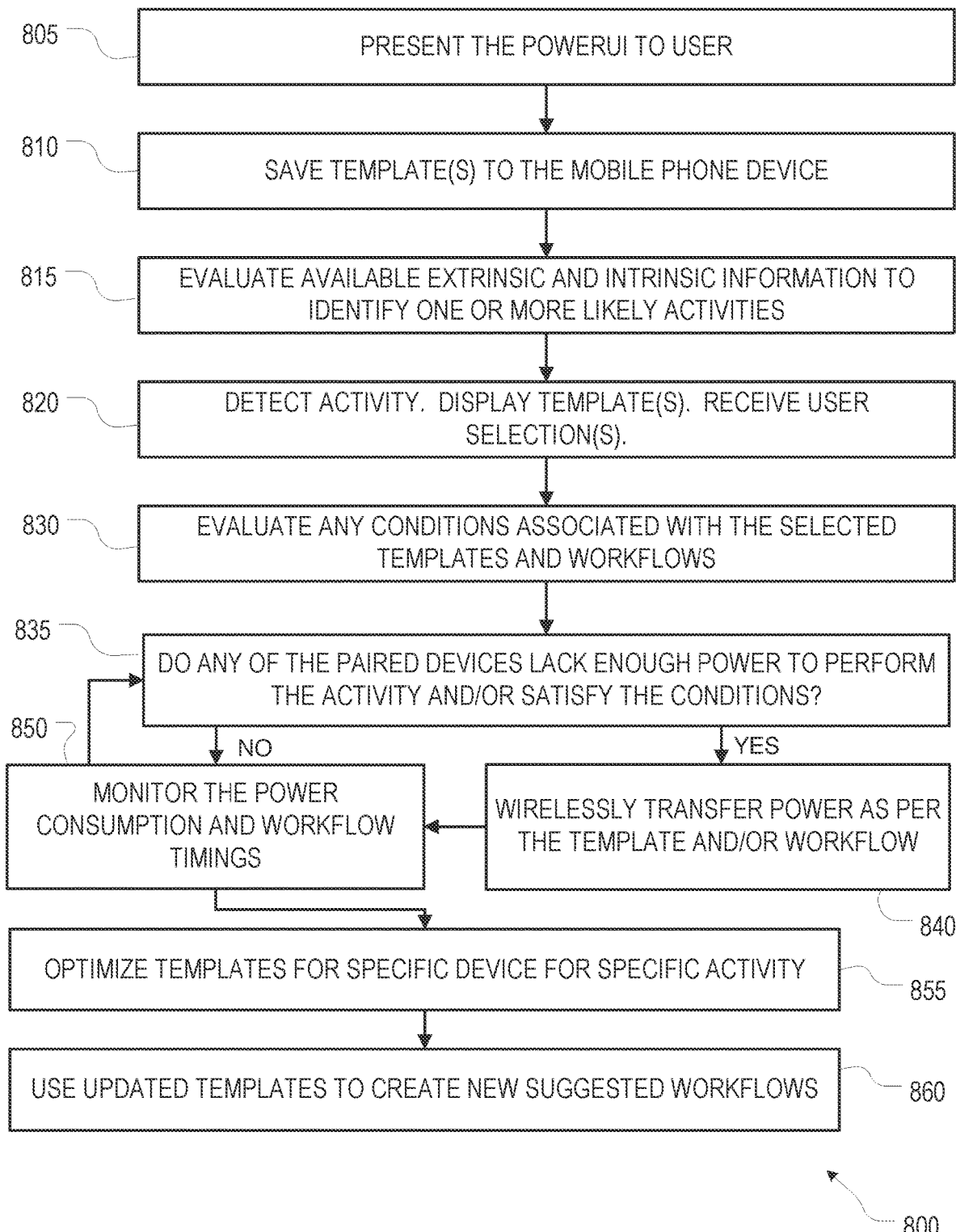
FIG. 8 is a flow chart showing one method of using power templates by a power management application, consistent with some embodiments.

FIG. 8 is a flow chart 800 showing one method of using power templates by a power management app 114, consistent with some embodiments. At operation 805, the power management app 114 may present the PowerUI 400 to the user. Using this user interface 400, the user may be presented with an opportunity to create different types of templates to transfer power among the paired devices. Additionally, while creating these templates, some embodiments may automatically identify one or more suggested activities for the template, predict one or more accessory devices that will likely be used while the user performs the suggested activities, calculate a predicted power consumption profile for each of the devices (e.g., the mobile phone device 100 and the paired accessory devices) for each suggested activity, and recommend the power transfer direction, amount, and/or trigger for each of the various devices for each activity. After the templates are created, the user may save the template(s) to the mobile phone device 100 at operation 810. At operation 815, the mobile phone device 100 may evaluate available extrinsic and intrinsic information to identify one or more likely activities to which the template(s) should be assigned. These activities may be suggested to the user to associate with the template(s). In some embodiments, these recommendations and suggestions may be generated by the AI system described with reference to FIGS. 5-7.

The user may begin to use the devices. In response, the AI system 600 of the power management application 114 may detect the user is performing one of the activities at operation 820. In response, the power management application 114 may display one or more suggested template(s) such that, based on contextual need, the user can manually select the most appropriate template and/or manually adjust one of the templates at operation 820. Additionally, the user may select two or more of the templates in the Power UI, and define the time range/duration for each, to create a workflow at operation 820.

In response, the power management application 114 may evaluate any conditions associated with the selected templates and workflows at operation 830, e.g., a first priority is to keep enough battery power to ensure a first accessory device can be continuously used for 60 minutes, a second priority is to ensure that a second accessory devices can be continuously used for at least 30 minutes. The power management application 114 may then calculate whether any of the paired devices lack enough power to perform the activity and/or satisfy the conditions at operation 835. This calculation may include one or more user priorities in the selected template, the timing of current and future activit(ies), the current power status of the user's mobile phone device 100, and its paired accessory devices.

If the user's power availability in one or more of the devices is not sufficient according to the template, then the power management application 114 may direct the mobile phone device 100 and/or the participating devices may begin transferring power between each other at operation 840 in a wireless manner so that the power availability at each device is aligned as per the template and/or workflow. If more than one device lacks sufficient power, then some embodiments may prioritize power transfer based on the user priorities in the templates at operation 840. The power management application 114 may then proceed to continuously monitor the power consumption of all of the devices at operation 850, as well as the specific activity timing (if any) remaining for a workflow.

In some embodiments, the power management application 114 may continue to collect current data about each device's power consumption by this user, indexed by the identified activity. The power management application 114 may use this current data to continuously optimize the templates at operation 855. In some embodiments, this may include using this current data to retrain the AI system 600 using the methods described with reference to FIG. 7.

At operation 860, the power management application 114 may use two or more of the new and/or updated templates to create new suggested workflows. The power management application 114 may present these new workflows to the user for approval in some embodiments. In addition, the user may approve these suggested workflows and/or use the current data to manually create new and/or update existing templates and workflows, at operation 860.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A method of power control for mobile devices, comprising:
   providing a power management application in a first mobile device of a plurality of mobile devices, wherein, through a user interface of the power management application, a user creates and saves one or more power sharing templates that define how the plurality of mobile devices will share power between themselves, and wherein, based at least in part on a current location of the first mobile device and a historical usage pattern at the current location, the power management application identifies one or more suggested activities for the one or more power sharing templates, predicts one or more accessory devices that will likely be used while the user performs the suggested activities, calculates a predicted power consumption profile for each of the accessory devices, and, through the user interface, recommends a transfer direction, amount, and/or trigger for each of the plurality of mobile devices for each activity; and wirelessly sharing power among the plurality of mobile devices according to a user-selected one of the one or more power sharing templates.

2. The method of claim 1, wherein the recommended transfer direction is based at least in part on predicted future activity of the user of the first mobile device.

3. The method of claim 1, wherein the power management application presents the selected template to the user on a power availability interface.

4. The method of claim 1, wherein each of the power sharing templates comprises a power priority among the plurality of mobile devices.

5. The method of claim 4, wherein the power management application:

calculates a direction of wireless power transfer from among the plurality of mobile devices according to the power priority of the user-selected one of the one or more power sharing templates; and initiates wireless power transfer from a first of the plurality of mobile devices to a second of the plurality of mobile devices using the calculated direction of wireless power transfer.

6. The method of claim 1, further comprising presenting the one or more suggested activities to the user for approval.

7. A computer program product for a method of power control for mobile devices, comprising a computer readable storage medium having program instructions embodied therewith, the program instructions executable by a processor to cause the processor to:

provide a power management application in a first mobile device of a plurality of mobile devices, wherein, through a user interface of the power management application, a user creates and saves one or more power sharing templates that define how the plurality of mobile devices will share power between themselves, and wherein, based at least in part on a current location of the first mobile device and a historical usage pattern at the current location, the power management application identifies one or more suggested activities for the one or more power sharing templates, predicts one or more accessory devices that will likely be used while the user performs the suggested activities, calculates a predicted power consumption profile for each of the accessory devices, and, through the user interface, recommends a transfer direction, amount, and/or trigger for each of the plurality of mobile devices for each activity; and wirelessly share power among the plurality of mobile devices according to a user-selected one of the one or more power sharing templates.

8. The computer program product of claim 7, wherein the recommended transfer direction is based at least in part on predicted future activity of the user of the first mobile device.

9. The computer program product of claim 7, wherein the power management application presents the selected template to the user on a power availability interface.

10. The computer program product of claim 7, wherein each of the user-selectable power sharing templates comprises a power priority among the plurality of mobile devices; and wherein the power management application:

calculates a direction of wireless power transfer from among the plurality of mobile devices according to the power priority of the user-selected one of the one or more power sharing templates; and initiates wireless power transfer from a first of the plurality of mobile devices to a second of the plurality of mobile devices using the calculated direction of wireless power transfer.

11. A mobile data processing device comprising a processor and a wireless power transfer system, the processor configured to execute instructions that cause the mobile data processing device to:

provide a power management application in a first mobile device of a plurality of mobile devices, wherein, through a user interface of the power management application, a user creates and saves one or more power sharing templates that define how the plurality of mobile devices will share power between themselves, and wherein, based at least in part on a current location of the first mobile device and a historical usage pattern at the current location, the power management application identifies one or more suggested activities for the one or more power sharing templates, predicts one or more accessory devices that will likely be used while the user performs the suggested activities, calculates a predicted power consumption profile for each of the accessory devices, and, through the user interface, recommends a transfer direction, amount, and/or trigger for each of the plurality of mobile devices for each activity; and wirelessly share power among the plurality of mobile devices according to a user-selected one of the one or more power sharing templates.

12. The mobile data processing device of claim 11, wherein the recommended transfer direction is based at least in part on predicted future activity of the user of the first mobile device.

13. The mobile data processing device of claim 11, wherein the power management application presents the selection template to the user on a power availability interface.

14. The mobile data processing device of claim 11, wherein each of the power sharing templates comprises a power priority among the plurality of mobile devices.

15. The mobile data processing device of claim 14, wherein the power management application calculates a direction of wireless power transfer from among the plurality of mobile devices according to the power priority of the user-selected one of the one or more power sharing templates; and wherein the wireless power transfer system initiates wireless power transfer from a first of the plurality of mobile devices to a second of the plurality of mobile devices using the calculated direction of wireless power transfer.

\* \* \* \* \*